Oct. 9, 1934.  C. FINCH  1,976,663
SYNCHRONIZED SPRING CLOCK MOVEMENT
Filed Feb. 17, 1932
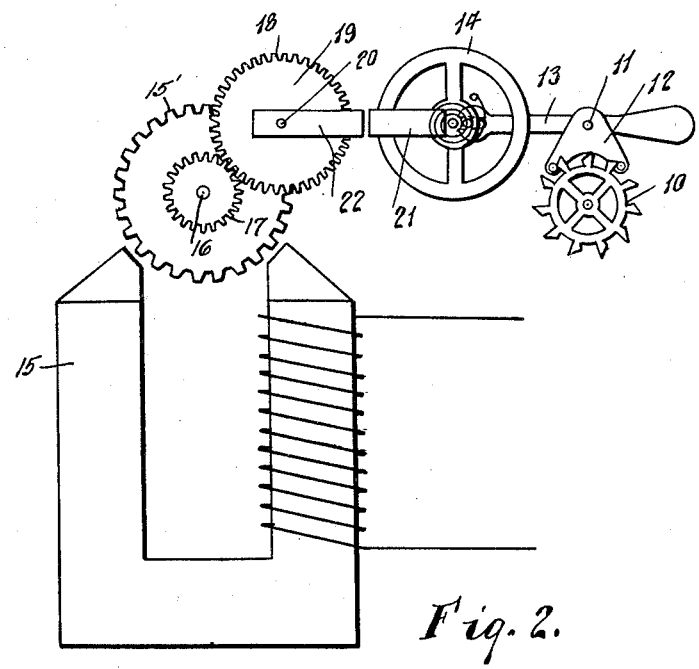
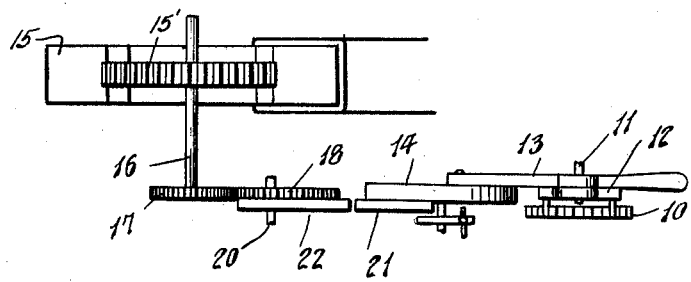
Inventor
C. Finch.
By L. F. Randolph Jr.
Attorney Patented Oct. 9, 1934

1,976,663

UNITED STATES PATENT OFFICE 1,976,663

SYNCHRONIZED SPRING CLOCK MOVEMENT

Clark Finch, West Palm Beach, Fla.

Application February 17, 1932, Serial No. 593,611

2 Claims. (Cl. 58—26)

This invention relates to a synchronized control for a spring actuated clock movement.

It is particularly aimed to provide a construction whereby a synchronous motor controls the escapement of a spring clock to keep the same in step with the motor and insure the keeping of correct time.

The more specific objects and advantages will become apparent from a consideration of the description following taken in connection with accompanying drawing illustrating an operative embodiment.

In said drawing:—

Figure 1 is a fragmentary elevation of a clock movement embodying the invention, and Figure 2 is a plan view of said movement.

Referring specifically to the drawing, only sufficient parts have been shown to illustrate the present invention, many parts of the clock movement being omitted for the sake of clearness and since the same is conventional structure and not a part of my invention.

An ordinary escapement wheel is provided at 10 which is driven by usual gearing from a spring motor of an ordinary clock movement. A rock shaft is shown at 11 carrying a pallet 12 and an impulse or escapement lever 13 which is operatively associated in the usual manner with a balance wheel 14. As usual, the escapement wheel 10 actuates the pallet 12 and lever 13 in the usual manner. Balance wheel 14 makes two double swings per second of time.

A synchronous electric motor is shown having a stator at 15 and a rotor 15' which operates continuously, said motor having proper connection with the spring motor of the clock movement as to automatically wind the same. The shaft 16 of said motor has a pinion 17 thereon which meshes with the teeth 18 of a control wheel 19 journaled on a shaft 20. Control wheel 19 is positively revolved by the motor 15 twice per second. Synchronous motor 15 is energized from an alternating current source having a regulated frequency.

The balance wheel 14 and control wheel 19 carry permanent magnets thereon at 21 and 22, respectively.

As a result of the construction described the outer end of the magnets 21 and 22 meet during every revolution of the control wheel, so that any variation in the position of the balance wheel for such time, will be automatically corrected by the pull of the magnets toward each other, the action of the magnet 22 being positive or forceful while that of magnet 21 is easily variable due to the mounting of the balance wheel, the magnet 21 thus keeping in step with the magnet 22.

The invention may be applied to both balance wheel and pendulum clocks.

Various changes may be resorted to provided they fall within the spirit and scope of the invention.

What is claimed is:—

1. In a mechanism of the class described, a balance wheel, a synchronous motor, permanent magnetic means on said balance wheel, permanent magnetic means rotatable by said synchronous motor functioning to pass the first mentioned magnetic means at regular intervals and in correct synchronous time, thereby forcing the first magnetic means to keep in step with the synchronous speed of the second mentioned magnetic means.

2. In a mechanism of the class described, a balance wheel, a synchronous motor, a train of gearing driven by said motor, permanent magnetic means on one gear of said train, a balance wheel, permanent magnetic means on said balance wheel, the first mentioned magnetic means functioning to pass the second mentioned magnetic means at regular intervals and in correct synchronous time, thereby forcing the second magnetic means to keep in step with the synchronous speed of the first mentioned magnetic means.

CLARK FINCH.